United States Patent
Spannbauer et al.

(10) Patent No.: US 11,655,752 B2
(45) Date of Patent: May 23, 2023

(54) WATER SEPARATOR TO SLOW WATER INGESTION

(71) Applicant: FORD GLOBAL TECHNOLOGIES, LLC, Dearborn, MI (US)

(72) Inventors: Shawn Michael Spannbauer, Royal Oak, MI (US); Shuya Shark Yamada, Novi, MI (US); Stephen George Russ, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/490,388

(22) Filed: Sep. 30, 2021

(65) Prior Publication Data

US 2023/0104275 A1    Apr. 6, 2023

(51) Int. Cl.
*F02B 33/00*    (2006.01)
*F02B 29/04*    (2006.01)

(52) U.S. Cl.
CPC ...... *F02B 29/0468* (2013.01); *F02B 29/0443* (2013.01)

(58) Field of Classification Search
CPC .......................... F02B 29/0468; F02B 29/0443
USPC ....................................................... 123/563
See application file for complete search history.

(56) References Cited

U.S. PATENT DOCUMENTS

| | | | | |
|---|---|---|---|---|
| 3,266,224 | A * | 8/1966 | Ferretti | B01D 47/028 96/358 |
| 7,266,958 | B2 * | 9/2007 | Milde | B01D 45/16 62/150 |
| 8,132,559 | B2 * | 3/2012 | Dong | B01D 46/2411 123/519 |
| 8,474,558 | B2 | 7/2013 | Ohira et al. | |
| 9,046,063 | B2 | 6/2015 | Landgraf et al. | |
| 9,545,844 | B2 | 1/2017 | Forty et al. | |
| 10,280,879 | B2 | 5/2019 | Stempien et al. | |
| 2002/0108497 | A1 * | 8/2002 | Wong | B01D 47/06 96/272 |
| 2004/0079079 | A1 * | 4/2004 | Martin | F02B 29/0406 60/605.2 |
| 2010/0229549 | A1 * | 9/2010 | Taylor | F02B 29/0468 60/599 |
| 2022/0025811 | A1 * | 1/2022 | Fagerstrom | B01D 53/265 |

* cited by examiner

*Primary Examiner* — Hung Q Nguyen
*Assistant Examiner* — Anthony Donald Taylor, Jr.
(74) *Attorney, Agent, or Firm* — Vincent Mastrogiacomo; Brooks Kushman P.C.

(57) ABSTRACT

An engine system includes a charge-air cooler, a separator for separating water from an airflow, and an engine. The separator causes an airflow from the charge-air cooler to strike one or more partitions and change directions via a serpentine path such that water is separated out of the airflow before the airflow reaches the engine.

20 Claims, 3 Drawing Sheets

WATER SEPARATOR TO SLOW WATER INGESTION

TECHNICAL FIELD

The present disclosure relates to separation techniques and more particularly to separating water from the air stream of an engine.

BACKGROUND

Generally, compositions in nature are not readily available in their isolated state. Instead, many compositions exist, are harvested, and are used as mixtures. Accordingly, separation of these materials may be necessary or desirable. Separation techniques may be useful to various industry. For example, separation techniques may be useful to engine systems such as those found in vehicles, tools, and/or automotive devices via various components such as combustion engines, fuel cells, and/or exhaust systems. For example, water may be detrimental or undesirable to automotive systems and particular combustion systems. However, water is commonly found in many natural materials and substances such as air. Water may reduce the efficacy or interfere with combustion. Still further, water can lead to corrosion and degradation of materials commonly found in automotive systems.

SUMMARY

An engine system including a charge-air cooler, a separator, and an engine is disclosed. During operation these components are in fluid communication such that air flows from the charge-air cooler to the separator and then to the engine. The separator defines a first and a second chamber. The first chamber includes one or more partitions that obstruct the airflow and direct it as it travels from the charge-air cooler to the engine during operation. The first chamber defines a serpentine path that separates water from the air traveling through the path such that the water is collected at a base of the first chamber. The collected water is drained via gravity from the base into the adjacent second chamber, which is in fluid communication with the first chamber.

A vehicle system including an air intake system, an engine downstream, and a separator therebetween is disclosed. The separator includes first and second chambers adjacent to and in fluid communication with one another. The first chamber includes an inlet for receiving an airflow, a fluid pathway, and an outlet for expelling the airflow. The fluid pathway includes a first bend such that an airflow traveling through the fluid pathway hits and turns around the contours of the pathway during operation such that water is separated from the airflow. The separated water is collected in the second chamber.

A vehicle including a heat exchanger, a separator downstream from the heat exchanger, and an engine downstream of the separator is disclosed. The heat exchanger is used to cool air. The separator is in fluid communication with the heat exchanger and the engine. The separator includes a peripheral wall and a dividing wall defining first and second chambers. The first and second chambers are in fluid communication. The first chamber includes an inlet, an outlet, and a fluid channel therebetween. The channel is configured to change the direction of an airflow flowing from the inlet to the outlet a plurality of times such that water is separated from the airflow. The separated water is drained into the second chamber.

DETAILED DESCRIPTION

Figure 1:
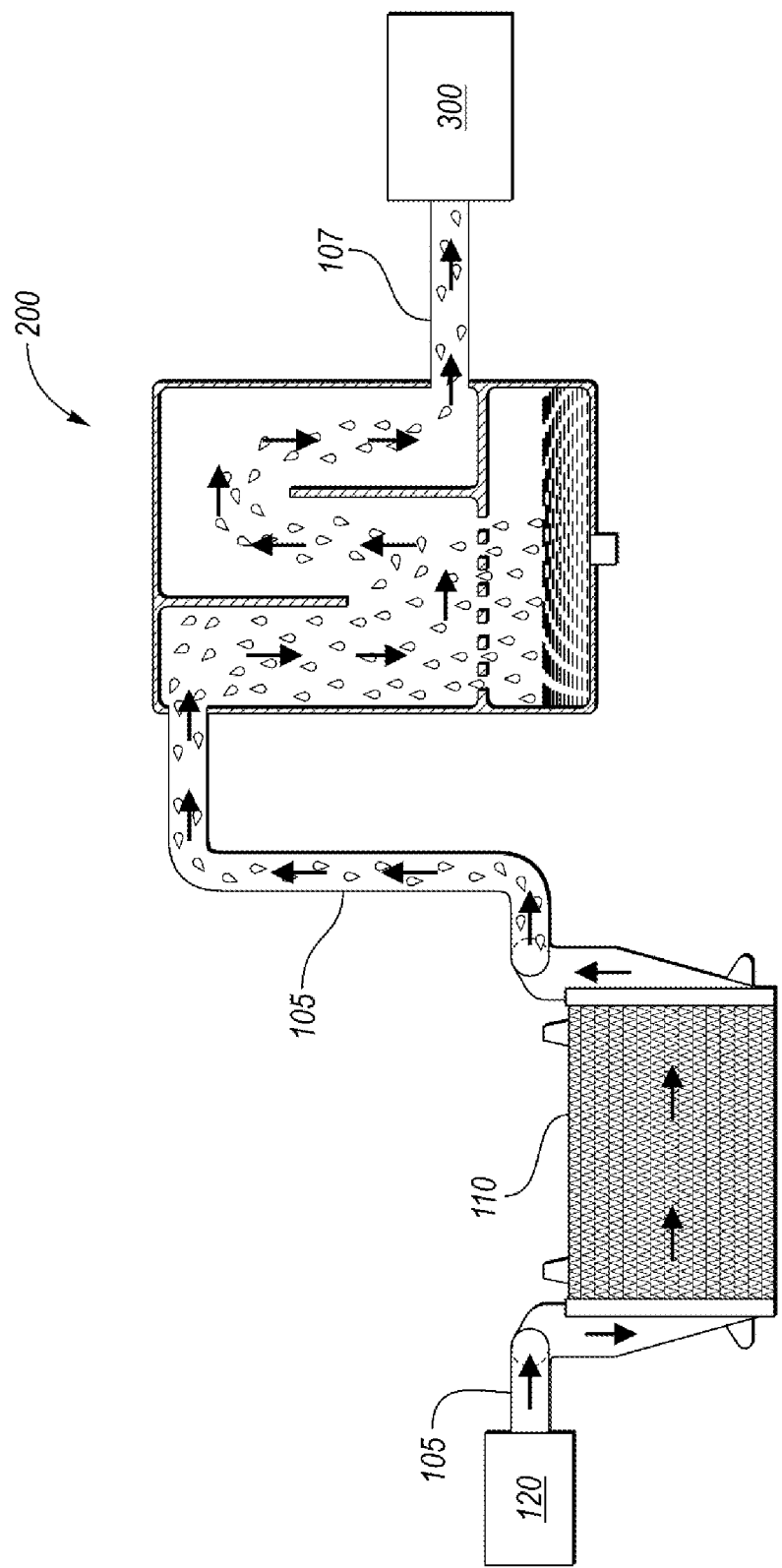
FIG. 1 is a schematic of an engine system.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments of the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Unless expressly stated to the contrary, percent, "parts of," and ratio values are by weight; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

This disclosure is not limited to the specific embodiments and methods described below, as specific components and/or conditions may vary. Furthermore, the terminology used herein is used only for the purpose of describing particular embodiments and is not intended to be limiting in any way.

As used in the specification and the appended claims, the singular form "a," "an," and "the" comprise plural referents unless the context clearly indicates otherwise. For example, reference to a component in the singular is intended to comprise a plurality of components.

The term "substantially" or "generally" may be used herein to describe disclosed or claimed embodiments. The term "substantially" may modify a value or relative characteristic disclosed or claimed in the present disclosure. In such instances, "substantially" may signify that the value or relative characteristic it modifies is within ±0%, 0.1%, 0.5%, 1%, 2%, 3%, 4%, 5% or 10% of the value or relative characteristic.

It should also be appreciated that integer ranges explicitly include all intervening integers. For example, the integer range 1-10 explicitly includes 1, 2, 3, 4, 5, 6, 7, 8, 9, and 10. Similarly, the range 1 to 100 includes 1, 2, 3, 4 . . . 97, 98, 99, 100. Similarly, when any range is called for, intervening numbers that are increments of the difference between the upper limit and the lower limit divided by 10 can be taken as alternative upper or lower limits. For example, if the range is 1.1. to 2.1 the following numbers 1.2, 1.3, 1.4, 1.5, 1.6, 1.7, 1.8, 1.9, and 2.0 can be selected as lower or upper limits.

An engine system is provided. The engine system may be part of a vehicle or vehicle system. The engine system may be employed in various engine-based tools such as but not limited generators and vehicles. FIG. 1 depicts the engine system 10 including an air intake system 100 including a charge air-cooler 110, a separator 200, and an engine 300 respectively downstream from one another and in selective or intermittent fluid communication during operation. The engine system 10 may be configured to remove water from air before it reaches the engine. In one variation, the system 10 may separate at least 30% of the water, or more preferably at least 40%, even more preferably at least 50% of the water from the air before going to the engine. In a refinement, the system 10 may separate 30-99% of the water, or more preferably 40-90%, or even more preferably 50-75% of the water before it proceeds to the engine 300. The water may be removed from the system 10 or may be reintroduced into the system 10 in a manner that does not disrupt the system.

The air intake system 100 may receive ambient or conditioned air 105 that is injected or used to cool the engine 300 during operation. The ambient or conditioned air 105 may include liquid (e.g., mist, fog, etc.) or gaseous (e.g., water vapor) water. The air intake system 100 may include a charge-air cooler 110 which may also be referred to as an intercooler. The charge-air cooler 110 may compliment, for example, an air compressor component 120 such as a supercharger or turbocharger. The air compressor component 120 may condense air or provide the engine with air at pressures greater than atmospheric pressure (i.e., greater fuel loads and/or more $O_2$). The air compressor component 120 may heat the compressed air. The charge-air cooler 110 may cool the compressed air from the air compressor component 120 to further densify the air before reaching the engine 300. The charge-air cooler 110 may use a heat exchanger for cooling the air. Fluctuation in air temperatures may lead to condensation or the collection of water in certain components or airflows. Generally, water in engine systems is undesirable as it may negatively affect combustion and/or power. Water may also lead to corrosion of engine components. However, separation or removal of water may require restricting the air flow. But too much restriction may again reduce combustion or power. It may also be uneconomical or impractical to eliminate all water from an engine system. Disclosed herein is a system that separates water with minimal affects on airflow, efficiency, and/or power.

The separator 200 may be located downstream from but in fluid communication with the charge-air cooler 110 but before the engine 300. In other words, the separator 200 may be between the charge-air cooler 110 and the engine 300. Hereinafter the system 100 and separator 200 may be described by referring to a fluid mixture as ambient or conditioned air 105. The fluid mixture includes a heavier and/or more dense fluid and a lighter and/or less dense fluid such as a mixture of air, and gaseous and/or liquid water. The separated air 107 may be referred to as engine air, de-watered, treated air, and/or gaseous oxygen ($O_2$). However, this should not be understood as limiting the disclosure to a system that can only separate water from air and may be suitable for separating mixtures including various composition having different weights or densities.

Figure 2A:
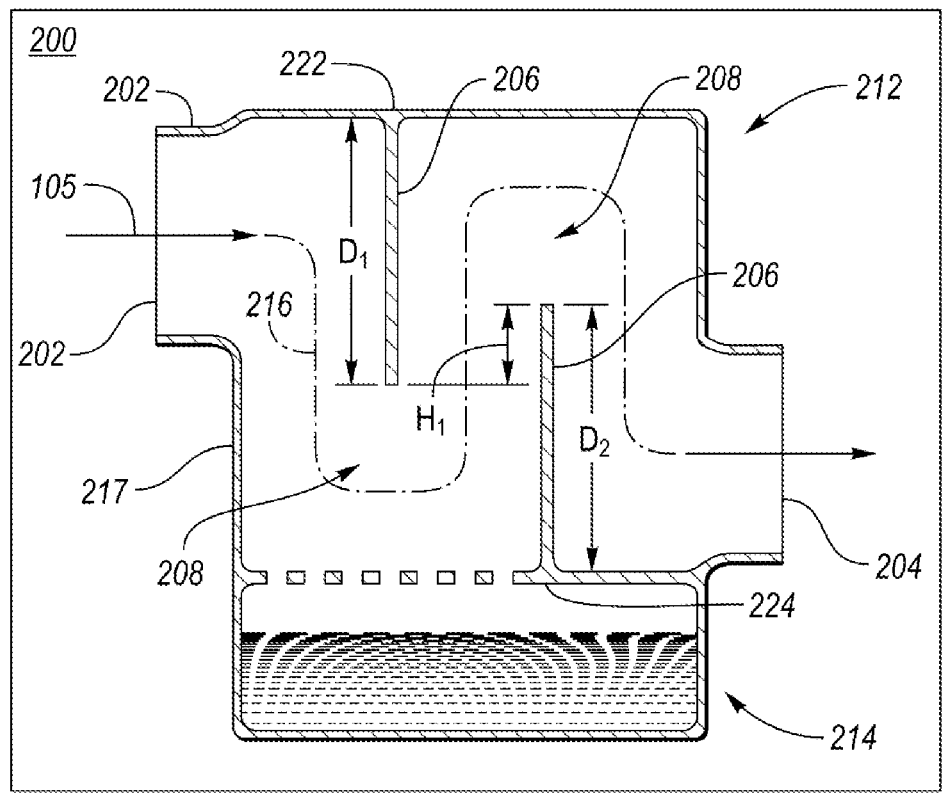
FIGS. 2A and 2B are cross-section views of a separator.
Figure 2B:
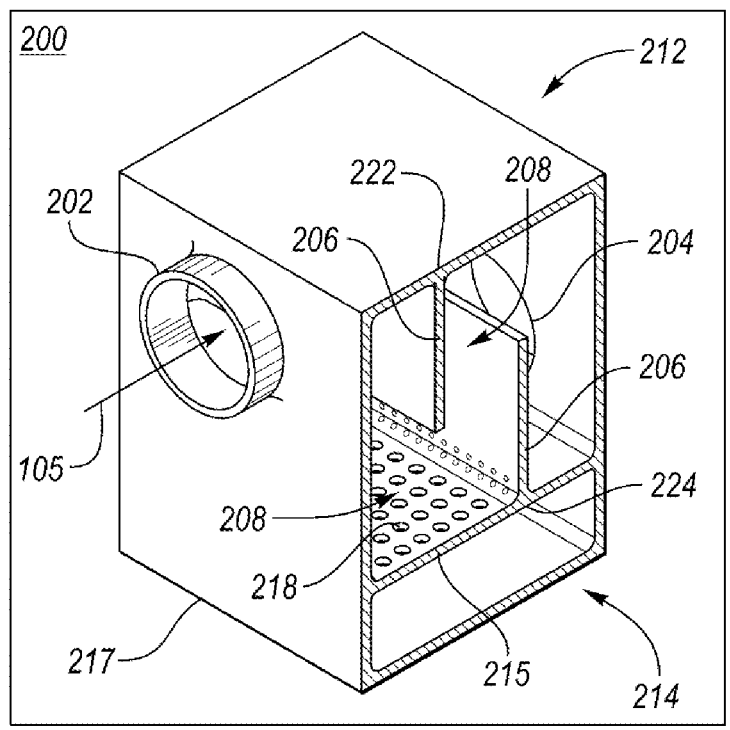

As shown in FIG. 2, the separator 200 may include a fluid (e.g., air) inlet 202 for receiving ambient or conditioned air 105 and a fluid (e.g., air) outlet 204 where air exits the separator and is transported to the engine 300. The separator 200 may be configured such that the ambient or conditioned air 105 entering the inlet 202 encounters one or more partitions 206 and navigates one or more turns or bends 208 before reaching the outlet 204. Explained differently, the direction of the air may be changed by the separator such that water is separated from the air. For example, the air may enter the inlet 202 traveling in a first direction thus striking a first partition and changing directions to a second direction. This may be repeated numerous times. The first partition may have a face that is at least 20 to 160 degrees, or more preferably 45 to 135 degrees, or even more preferably 60 to 120 degrees from the first direction of the airflow. For example, the face of the first partition may be 90 degrees or form a right angle with the first direction of the air flow.

In a variation, the separator 200 may include a housing 210 or peripheral wall 217 and dividing wall 215 defining first and second chambers 212, 214. The first chamber 212 may include a base and one or more partitions 206 (e.g., a plurality of partitions) extending from the walls such that the one or more partitions 206 are disposed within the first chamber 212 between the inlet 202 and outlet 204. The second chamber 214 may be adjacent to the base 215 and in fluid communication with the first chamber 212. In a refinement, the first chamber 212 may be cube shaped having a height of 150 mm, a length of 150 mm, and a width of 150 mm. The second chamber 214 may be a cuboid shape having a height of 47.8 mm, a length of 150 mm, and a width of 150 mm. The one or more partitions 206 may each extend 100 mm from the peripheral and/or dividing walls 217, 215. The walls and/or partitions may have a width of 3 mm. The inlet and outlet may each have a diameter of 76.2 mm.

The walls and one or more partitions may form a serpentine path 216 (i.e., a pathway, a channel, or a conduit with one or more bends or turns in it). The air or airflow may change direction a plurality of times while traveling through the serpentine path 216 and after striking the one or more partitions 206. For example, the path or pathway 216 may be S-shaped such that the inlet 202 and outlet 204 are disposed at opposite ends of the S-pattern. In a refinement, the width of the path may be the same throughout the path or may vary along the path. For example, the path may be 46 mm at a first section and 50 mm at a second section. The one or more partitions 206 may obstruct the air flow of the ambient or conditioned air 105 that enters the separator 200 through the inlet 202. The one or more partitions 206 may be configured such that the air flowing into the separator 200 via the inlet 202 strikes the one or more partitions 206.

Without being bound by theory, it is believed that striking the one or more partitions 206 stops or reduces the inertia of heavier molecules and/or droplets to the point that they are no longer traveling at the same speed or do not have the same inertia as light molecules and/or droplets. In other words, the lighter molecules stop and accelerate faster creating a gradient. For example, the inertia of water droplets may stop by striking the one or more partitions 206 and may collect on the one or more partitions 206 and drain to the base. At the same time water droplets navigating the serpentine path 216 including one or more bends 208 cause the fluids to turn invoking centrifugal action that separates heavier molecules and/or droplets. The heavier molecules and/or droplets turn slower than lighter molecules and/or droplets. In other words, the system 10 and separator 200 may separate a fluid mixture having two compositions of different densities. Sharper turns and greater flow rates or air speeds may produce greater separation phenomena because of the reliance on inertia and centrifugal action mechanisms. Thus, separation may not occur until a threshold speed or flow rate is achieved and a predetermined flow rate or speed may be used to ensure separation. Similarly, separation may not occur until an engine warms up and achieves the threshold rate or speed. For example, the flow rate may be at least 8 lbs/minute, or more preferably at least 10 lbs/minute, or even more preferably 12 lbs/minute before sufficient separation is achieved.

The separated water may condense or pool as a liquid and travel, via gravity, to the base 215. The base 215 may be in fluid communication with the second chamber 214 by an orifice or plurality of orifices 218. Thus, the separated water may travel from the first chamber 212 to the second chamber 214 by the fluid communication provided by an orifice 218 in the base. In a refinement, a plurality of orifices (e.g., 77 or a 7×11 grid) having a diameter of, for example, 8 mm each may provide fluid communication between the first and second chambers 212, 214. The separated water may drain (e.g., travel by the force of gravity) and collect in the second chamber 214 where it is separated from the first chamber 212. The second chamber 214 may include a spout 219 for releasing the collected water. The spout 219 may release the collected water into the exterior environment, may reintroduce it into the air intake system 100, may introduce it into an ultrasonic agitator, or use any other means to dispose of it.

In a refinement, the one or more partitions 206 include a first partition 220 extending from a first portion 222 of the peripheral wall 217 and a second partition 224 extending from a second portion 226 of the dividing wall 215. In a variation, the second portion 226 may be opposite the first portion 222 to create sharp or tighter turns. The first partition may extend a first distance $D_1$ and the second partition may extend a second distance $D_2$ such that the partitions create an overlap height Hi. The overlap height Hi may be, for example, 50 mm. Having too great an overlap height Hi may result in airflow restrictions and overall pressure losses that negatively affect the performance of the engine 300. In a refinement, the overlap height Hi may be 1 to 100 mm, or more preferably 25 to 75 mm, or even more preferably 40 to 60 mm. In another variation, incorporation of the separator with the air intake system 100 may not increase the pressure loss of the air intake system 100 by more than 5 kPa, or more preferably 3 kPa, or even more preferably 2 kPa. The first and/or second distance $D_1$, $D_2$ may define a ratio from 0.5:1 to 5:1, more preferably 1:1 to 3:1, and even more preferably 1.5:1 to 2.5:1 with the overlap distance Hi.

In still another refinement, the inlet 202 may define a central axis Xi and at least one of the one or more partitions 206 may define a facial plane Yi. The central axis Xi and facial plane Yi are not parallel. In a variation, Yi may be arranged at least 20 to 160 degrees, or more preferably 45 to 135 degrees, or even more preferably 60 to 120 degrees from the central axis Xi. For example, the plane Yi may be 90 degrees or form a right angle with central axis Xi such that the encounter between the airflow and partition is the most severe, and inertia stopped or is significantly reduced.

In another variation, the separator 200 and fluid pathway 216 may be configured to separate at least 30%, or more preferably at least 40%, or even more preferably at least 50% of the total moisture from the air when the moisture content is at least 5 g/m$^3$, or more preferably at least 10 g/m$^3$, or even more preferably at least 15 g/m$^3$ in the ambient or conditioned air 105 at 25° C. and an air flow rate of at least 12 lbs/min. In one or more embodiments, the water content of the air exiting the separator 200 is less than 2% by weight, or more preferably less than 1%, or even more preferably less than 0.5%, or still more preferably less than 0.05% by weight. In a refinement, the moisture reaching the engine 300 may be defined by a rate and the separator 200 may be configured such that the rate of moisture reaching the engine 300 is at least 2 times less, or more preferably at least 3 times less, or even more preferably at least 4 times less than the rate of a system without the separator 200.

The engine 300 is not particularly limited and any shape and size engine may be suitable. In a variation, the engine 300 is a combustion engine and may have one or more combustion cylinders (e.g., 2, 4, 6 or 8 cylinders). The engine 300 is downstream from the separator 200 such that the separator can separate and remove water before it enters the one or more combustion chambers.

Figure 3A:
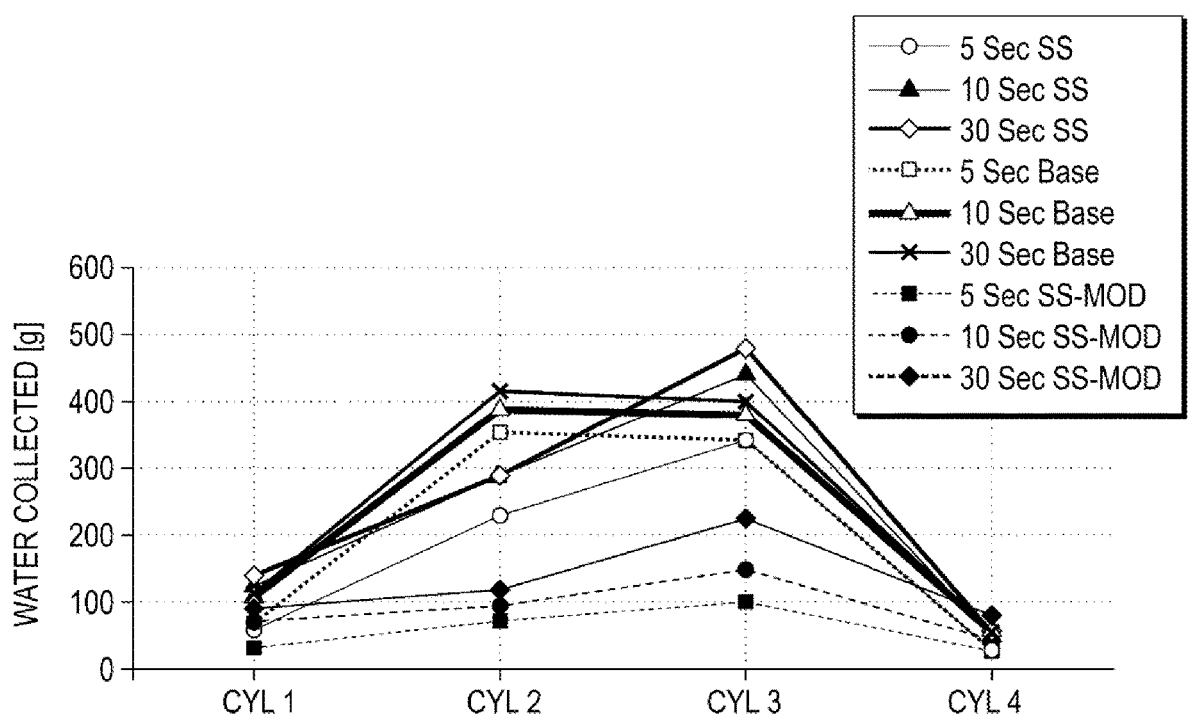
FIGS. 3A and 3B are graphs showing water collection with and without the separator.
Figure 3B:
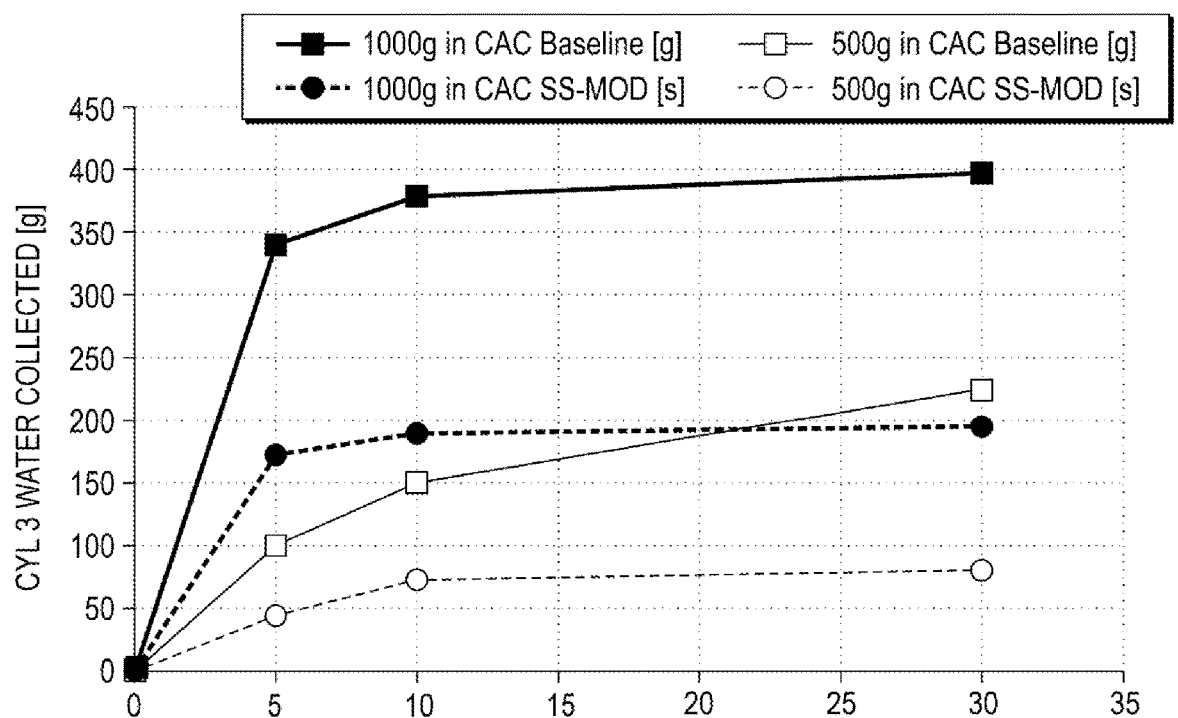

Experimental results of an engine system with and without a separator as described herein are shown in FIGS. 3A and 3B. As can be seen in FIG. 3A the water collected in the second and third cylinders is significantly less when a separator, as described herein, is used. Similarly, FIG. 3B demonstrates that water is introduced into the cylinders at a slower rate when the separator, described herein, is used. The experiments were conducted by adding 500 or 1000 grams of water into the charge air cooler, while in operation at an airflow rate of 12 pounds per minute and operating temperature (e.g., 25° C.).

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. An engine system comprising:
   a charge-air cooler;
   an engine; and
   a separator arranged in fluid communication with the charge-air cooler and the engine, the separator defining (i) a first chamber including an inlet, an outlet, and at least two partitions disposed therein, the at least two partitions and configured to obstruct and direct air from the charge-air cooler to the engine via a serpentine path such that water in the air collects at a base of the first chamber, and (ii) a second chamber adjacent to and in gravity-fed fluid communication with the base such that the water drains from the first chamber into the second chamber, wherein the at least two partitions include a first partition and a second partition that overlap such that air cannot travel directly from the charge-air cooler to the engine without being directed around the first and second partitions and along the serpentine path.

2. The engine system of claim 1, wherein the first partition extends from a peripheral wall of the first chamber, and the second partition extends from a dividing wall disposed between the first chamber and the second chamber, the dividing wall being opposite to the peripheral wall.

3. The engine system of claim 1, wherein the inlet has a central axis and wherein the first partition defines a first plane that is arranged in a position that is 20 to 160 degrees from the central axis such that the air strikes the first partition after entering the inlet.

4. The engine system of claim 2, wherein the serpentine path is S-shaped.

5. The engine system of claim 1, wherein the first partition extends a first distance and the second partition extends a second distance, such that the first and second partitions overlap by an overlap distance and the first and second distances each define a ratio from 0.5:1 to 5:1 with the overlap distance.

6. The engine system of claim 1, wherein the serpentine path is configured to separate a percent amount of the water from the air based on a total moisture content of the air.

7. The engine system of claim 1, wherein the air enters the separator in a first direction such that the air strikes the first partition.

8. A vehicle system comprising:
an air intake system;
an engine downstream from the air intake system; and
a separator between the air intake system and the engine, the separator including a first chamber defining an inlet, an outlet, and an S-shaped fluid pathway with at least a first bend and a second bend, and a second chamber adjacent to and in fluid communication with the first chamber such that an airflow from the air intake system travels through the inlet into and around a first partition and a second partition within the first chamber, thereby separating water from the airflow such that the water drains into the second chamber and the airflow exits through the outlet and towards the engine, wherein the first partition and the second partition overlap such that air cannot travel directly from the air intake system to the engine without being directed around the first and second partitions and along the S-shaped fluid pathway.

9. The vehicle system of claim 8, wherein the inlet has a first width that is less than a height of the first partition.

10. The vehicle system of claim 8, wherein the water drains into the second chamber via a plurality of orifices in a dividing wall disposed between the first chamber and the second chamber.

11. The vehicle system of claim 8, wherein an amount of the water separated from the air varies based on a flow rate of the air.

12. The vehicle system of claim 8, wherein the second chamber includes a release spout for releasing the water drained into the second chamber.

13. The vehicle system of claim 12, wherein the water drained into the second chamber is releasable into an external environment, back to the air intake system, or to an ultrasonic agitator via the release spout.

14. The vehicle system of claim 8, wherein the air intake system includes a charge-air cooler upstream of the separator and an air compressor component upstream of the charge-air cooler.

15. The vehicle system of claim 8, wherein the inlet has a central axis and wherein the first partition defines a first plane that is arranged at a position that is 45 to 135 degrees from the central axis such that the air strikes the first partition after entering the inlet airflow.

16. A vehicle comprising:
a heat exchanger for cooling air;
a cuboid-shaped separator downstream from and in fluid communication with the heat exchanger, the cuboid-shaped separator having a peripheral wall and a dividing wall defining first and second chambers in fluid communication with one another, the first chamber defining an inlet, an outlet, and a fluid channel configured to change a direction of an airflow from the inlet to the outlet a plurality of times via a first partition and a second partition disposed in the first chamber, such that water is separated from the airflow and drained into the second chamber; and
an engine downstream from and in fluid communication with the outlet for receiving the airflow, wherein the first partition and the second partition overlap such that air cannot travel directly from the heat exchanger to the engine without being directed around the first and second partitions and along the fluid channel.

17. The vehicle of claim 16, wherein the first and second partitions are positioned relative to one another between the inlet and the outlet so as to interfere with and change the direction of the airflow from the inlet to the outlet at least two times.

18. The vehicle of claim 17, wherein the first partition extends in a first direction and the second partition extends in a second direction opposite to the first direction.

19. The vehicle of claim 16, wherein the direction of the airflow is changed by at least 90 degrees.

20. The vehicle of claim 19, wherein the direction of the airflow is changed by at least 90 degrees at least twice.

* * * * *